E. H. FAILE.
VEHICLE SEAT.
APPLICATION FILED DEC. 3, 1908.

930,061.

Patented Aug. 3, 1909.
2 SHEETS—SHEET 1.

WITNESSES
G. Robert Thomas
C. W. Fairbank

INVENTOR
Edward Hall Faile

E. H. FAILE.
VEHICLE SEAT.
APPLICATION FILED DEC. 3, 1908.

930,061.

Patented Aug. 3, 1909.
2 SHEETS—SHEET 2.

WITNESSES
G. Robert Thomas
C. W. Fairbank

INVENTOR
Edward Hall Faile

UNITED STATES PATENT OFFICE.

EDWARD HALL FAILE, OF NEW YORK, N. Y.

VEHICLE-SEAT.

No. 930,061.　　　　Specification of Letters Patent.　　　Patented Aug. 3, 1909.

Application filed December 3, 1908. Serial No. 465,789.

*To all whom it may concern:*

Be it known that I, EDWARD HALL FAILE, a citizen of the United States, and a resident of the city of New York, borough of Manhattan, in the county and State of New York, have invented a new and Improved Vehicle-Seat, of which the following is a full, clear, and exact description.

This invention relates to certain improvements in double-seated vehicles, and more particularly to the construction of the rear seat of motor vehicles.

I am aware that carriages have been designed in which there are employed a front seat and a rear seat, the latter of which may be secured in position for use or may be moved forwardly to partially telescope with the front seat and present the appearance of a single-seated vehicle.

In my improved construction, the rear seat bottom is rigidly supported when in operative position and no jarring or shaking of the body and seat can accidentally loosen or dislodge it from its operative position. The space beneath the rear seat is unencumbered so that it may be used for storage purposes. The seat bottom may be moved to operative position independently of the back or sides of the seat and when in its folded or lowered position may constitute a guide for the back and sides of the seat during a portion of the movement of the latter and may also serve to close the entrance opening in the side of the vehicle body intermediate the two seats.

My improved body and seat may be constructed as hereinafter described, to embody all of these features, but it is evident that various of these features may be employed independently of the others.

Reference is to be had to the accompanying drawings, forming a part of this specification, in which similar characters of reference indicate corresponding parts in all the figures, and in which—

Figure 1:
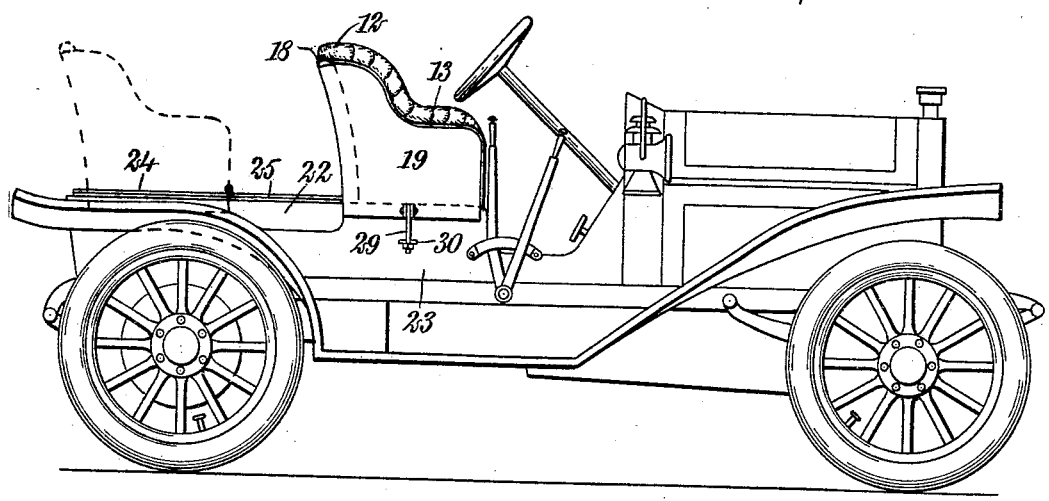
Figure 2:
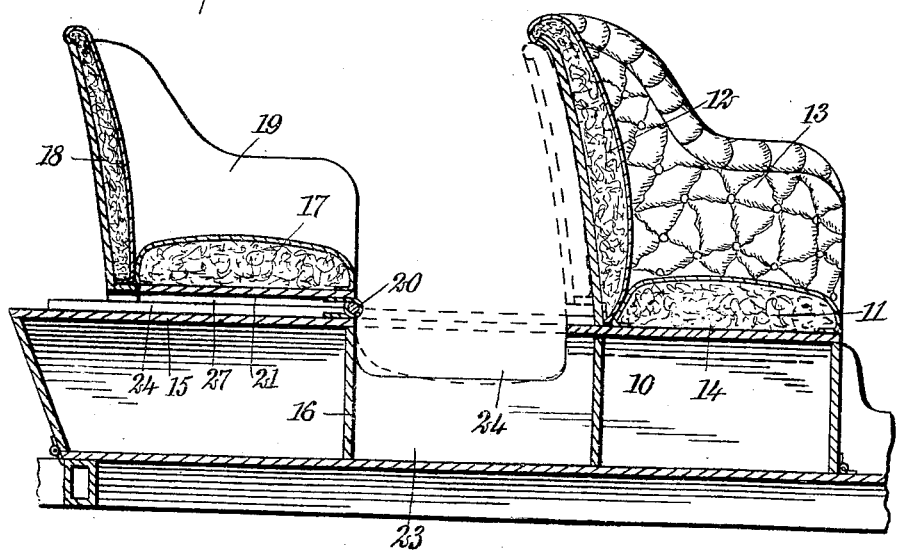
Figure 3:
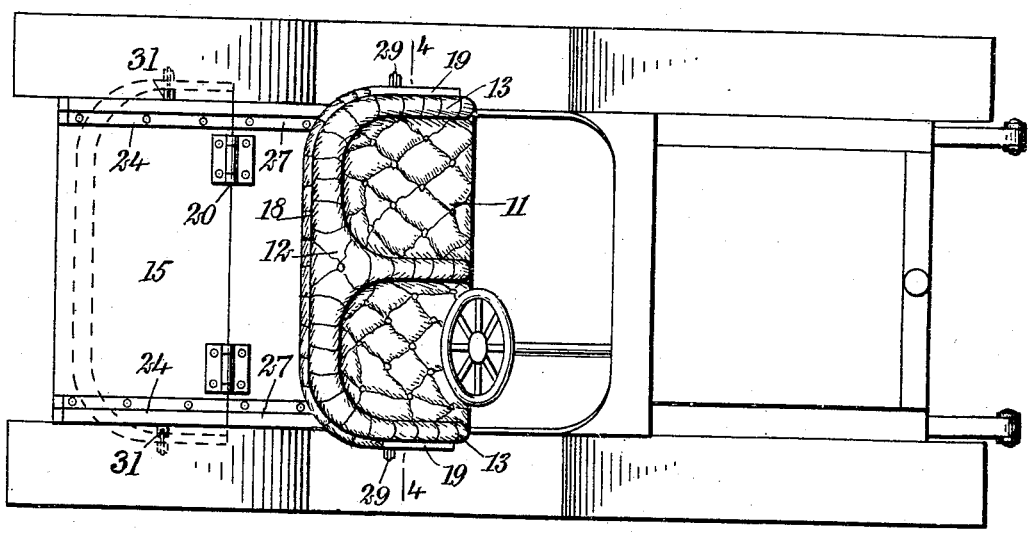
Figure 4:
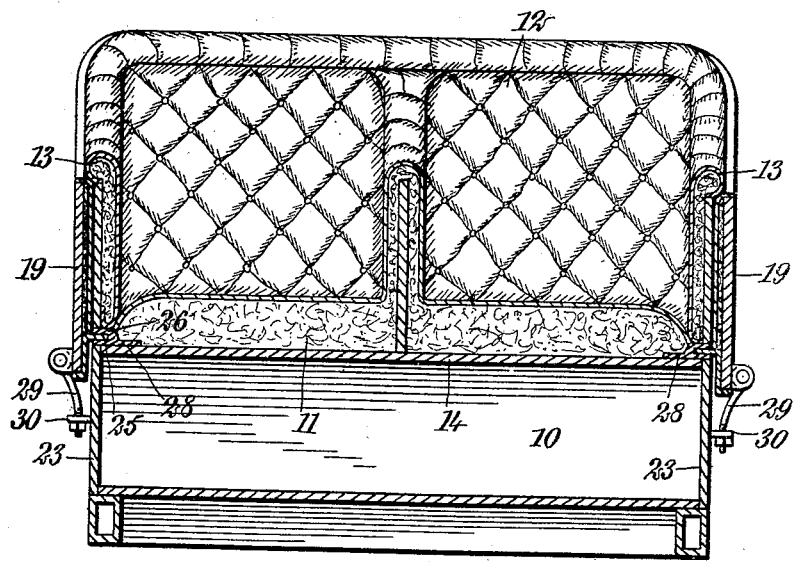

Figure 1 is a side elevation of a vehicle having a body and seat constructed in accordance with my invention; the rear seat being shown in solid lines in its inoperative position and in dotted lines in its operative position; Fig. 2 is a longitudinal section through the vehicle body and seats, the rear seat being shown in operative position in solid lines and in inoperative position in dotted lines; Fig. 3 is a top plan view of the vehicle as shown in Fig. 1; and Fig. 4 is a transverse section on the line 4—4 of Fig. 3 but on the same scale as Fig. 2.

In the specific form illustrated I employ a vehicle body or box 10, to which is secured a front seat including a seat proper or cushion 11, an upholstered back 12 and upholstered sides 13. This front seat is preferably rigidly secured to the vehicle body and need not vary in its main features of construction from the front seat ordinarily employed on two-seated automobiles. The cushion 11 of the front seat is supported on a deck board or top 14, which forms the top of the storage space beneath the seat and is in substantially the same horizontal plane as the deck board or top 15 of the rear portion of the body. These two deck portions are spaced apart to accommodate the occupants of the rear seat, and the body beneath the deck or top may be subdivided by a partition 16, to form separate chambers or compartments.

The rear seat includes a cushion or bottom 17, an upholstered back portion 18 and side portions 19, which last-mentioned may be only lightly upholstered. The cushion or seat bottom 17 is secured at its front edge to the rear back portion 15 by suitable hinges 20, and includes a deck portion 21 adapted to be superposed on the deck portion 15 when the seat is in operative position, and adapted to extend into alinement with the deck portions 15 and 14 and fill the opening therebetween when the seat is swung forwardly on the hinges 20 and into inoperative position. With the rear seat in the position indicated in Figs. 1 and 3 and in dotted lines in Fig. 2, the portion of the body back of the front seat presents a smooth uninterrupted deck or top. The rear seat bottom includes not only the cushion 17 and the deck portion 21, but also includes end bars 22 lying substantially in the same vertical plane as the side walls 23 of the body. These side walls of the body intermediate the hinges 20 and the front seat, are cut away to form openings 24, to facilitate the entrance of passengers to the rear seat of the car. The end bars or pieces 22 of the rear seat are of a shape and size corresponding to the openings or cutaway portions of the side walls of the body, so that when the rear seat is swung forwardly to inoperative position, these side pieces will fit and fill the entrance openings of the side of the body, and together with the deck portion 21, form a tight closure for the chamber within the body.

The back and sides of the rear seat are formed rigid in respect to each other and have sliding engagement with the body. The sides 19 are a slightly greater distance apart than the sides 13 of the front seat, so that when the sides and back of the rear seat are slid forwardly, the back and side portions of the two seats may telescope with the back of the rear seat in engagement with the back of the front seat and the sides of the rear seat in engagement with the outer surface of the sides of the front seat, substantially as illustrated in Fig. 3. The upper edges of the back and sides of one of the seats, preferably the front seat, extend out and are so disposed as to overhang the upper edges of the back and sides of the other seat and partially conceal the latter. This also prevents the admission of rain, snow, dust and other foreign substances to the space between the two backs. The deck portion 15 of the body is provided with runners, tracks, or guideways 24 upon its upper surface adjacent its opposite side edges, for supporting the sides and back of the rear seat and facilitating their sliding movement. These guideways or tracks are preferably formed of metal and have a groove 25 in their outer vertical faces into which extend corresponding flanges carried by the sides 19 of the rear seat, substantially as shown in cross section in Fig. 4. The sides of the rear seat extend down a slight distance below the plane of the deck or top of the body, and the flanges 26 extend inwardly at a slight distance above the lower edges of said sides. The deck portion 21 constituting a portion of the bottom of the rear seat, has tracks or guides 27 identical with the tracks or guides 24 of the deck portion 15, and they are so disposed that when the rear seat is in inoperative position, the guides 24 are in direct alinement with the guides or tracks 27. When the seat is in operative position as indicated in Fig. 2, the guides 27 rest directly upon the guides 24 throughout the length of the former and constitute a firm and rigid support for the seat throughout the entire length of the latter along each end thereof. The deck portion 14 disposed beneath the front seat, is provided with tracks or guideways 28, as indicated in Fig. 4, so as to receive the flanges or supports 25 of the rear seat when the latter is slid forwardly to its limiting position. The sides and back of the rear seat may be held in position in any suitable manner, but as indicated the sides are provided with depending hinged bolts 29, which may enter either of the separate retainers 30 or 31. These two retainers are so disposed as to facilitate the locking of the sides and back of the rear seat in either one of its two limiting positions.

One very important feature of my invention is the freedom of movement of the bottom of the rear seat when the sides and back of the rear seat are telescoped with the front seat and locked in position. As will be noted particularly in Fig. 2, the deck portion 14 terminates at a distance back of the rear surface of the back of the front seat substantially equivalent to the thickness of the back of the rear seat. Thus, when the back and sides of the rear seat are moved forwardly to the limiting position, they pass over the bottom of the rear seat and out of engagement therewith. The bottom of the rear seat may now be returned to operative position, so as to provide a seat for temporary use or for a footman. There are no catches, hooks, or locks for holding the bottom of the rear seat in operative position as it acts simply from gravity. In moving it to inoperative position, it must swing through an arc of one hundred and eighty degrees about a stationary pivot, and when in operative position, it locks the back and sides of the rear seat against forward movement. When the rear seat is in operative position, it can scarcely be detected from the rear seat of an ordinary two-seated vehicle, while when in its forward or inoperative position, it presents a neat appearance and its presence can hardly be noticed. The vehicle can be converted from a single-seated to a double-seated one in a very short space of time and no special tools or skill is required.

If desired, the back and sides of the rear seat may be entirely removed and left at home, so that the vehicle will appear no different than an ordinary single-seated vehicle with a body behind the front seat; then, if it is desired to provide an additional seat temporarily, the bottom or cushion of the rear seat may be raised and swung into operative position and employed, even though the back and sides of the seat are entirely absent. As shown, the ends of the cushion or seat proper close the opening or doorway in the side of the wagon body, but it is evident that if the seat or cushion be made slightly shorter, a swinging door may be used for closing this opening, the same as in the common constructions.

Having thus described my invention, I claim as new and desire to secure by Letters Patent,—

1. A vehicle body having a front seat and a movable rear seat including a seat bottom and a seat back, said seat bottom having a fixed support and hinged at its front edge to swing forwardly to inoperative position, and said seat back being slidable forwardly over said bottom to a position adjacent said front seat when said seat bottom is in inoperative position.

2. A vehicle body having a front seat and a movable rear seat including a seat bottom and a seat back, said seat bottom being supported independently of said seat back and hinged at its front edge to swing forwardly to inoperative position, and said seat back being slidable forwardly over said bottom to a position adjacent said front seat and beyond the front edge of said seat bottom when the latter is in inoperative position to permit the return movement of said bottom to operative position.

3. A vehicle body having a front seat, a stationary top or deck in the rear thereof and spaced therefrom to leave an opening, and a rear seat including a seat bottom normally superposed upon said top or deck and supported thereby and movable to close said opening, and a seat back slidable forwardly over said deck and bottom to a position adjacent said front seat.

4. A vehicle body having a front seat, a stationary substantially horizontal top or deck in the rear thereof and spaced therefrom to leave an opening, and a rear seat including a seat bottom normally supported by said top or deck and substantially parallel thereto and hinged to the front edge of said deck to swing forwardly into the plane of said top or deck to close said opening, and a seat back slidable forwardly over said deck and bottom to a position adjacent said front seat.

5. A vehicle body having a front seat, a stationary top or deck in the rear thereof and spaced therefrom to leave an opening, sides, each having an opening therein in the rear of said front seat, and a rear seat including a seat bottom having end pieces in the planes of said sides, said seat bottom being normally superposed upon said top or deck and movable to close said first-mentioned opening and to bring said end pieces into said side openings, to close the latter, and a seat back supported independently of the seat bottom and movable to an inoperative position.

6. A vehicle having a front seat, a body in the rear thereof and having a stationary deck or top spaced from the front seat to leave an opening and having the sides cut away to leave side openings, a rear seat back mounted to slide forwardly over said first-mentioned opening to a position adjacent said front seat, a rear seat bottom movable to inoperative position to close said first-mentioned opening, and means for closing said side openings.

7. A vehicle body having a front seat, a rigid deck board or top, a rear seat bottom hinged thereto, and a rear seat having sliding engagement with said deck board or top and movable over said seat bottom to a position adjacent said front seat.

8. A vehicle body having guides or tracks at the upper portion thereof adjacent opposite sides, a seat having guides or tracks, said seat being movable to bring its guides or tracks into alinement with the first-mentioned guides or tracks, and a seat back movable along said guides when the latter are in alinement.

9. A vehicle body having a top or deck board, guides or tracks extending along said top or deck board adjacent opposite sides, a seat bottom movable to inoperative position, and a seat back movable over said bottom and along said tracks.

10. A vehicle body having a seat bottom movable to inverted position and having a track or guide on the under side thereof, a seat back and means for supporting the same independently of said bottom, said seat back being movable off of said supporting means and along said track to operative or inoperative positions when said seat is inverted.

11. A vehicle body provided with a front seat having grooves in the outer surface of its ends, a rear seat having a bottom movable to inoperative position, and a back and sides provided with inwardly directed flanges movable along said grooves and independently of the movement of said bottom.

12. A vehicle body provided with a front seat having grooves in its ends constituting a track, a box having a track along opposite edges adjacent the upper surface, and a rear seat having a seat bottom and a back, said seat bottom being adapted to be inverted and having a track on its under surface in alinement with the first-mentioned tracks when said seat is inverted, said seat back being movable along said tracks.

In testimony whereof I have signed my name to this specification in the presence of two subscribing witnesses.

EDWARD HALL FAILE.

Witnesses:
CLAIR W. FAIRBANK,
G. F. GUNTHER.